UNITED STATES PATENT OFFICE.

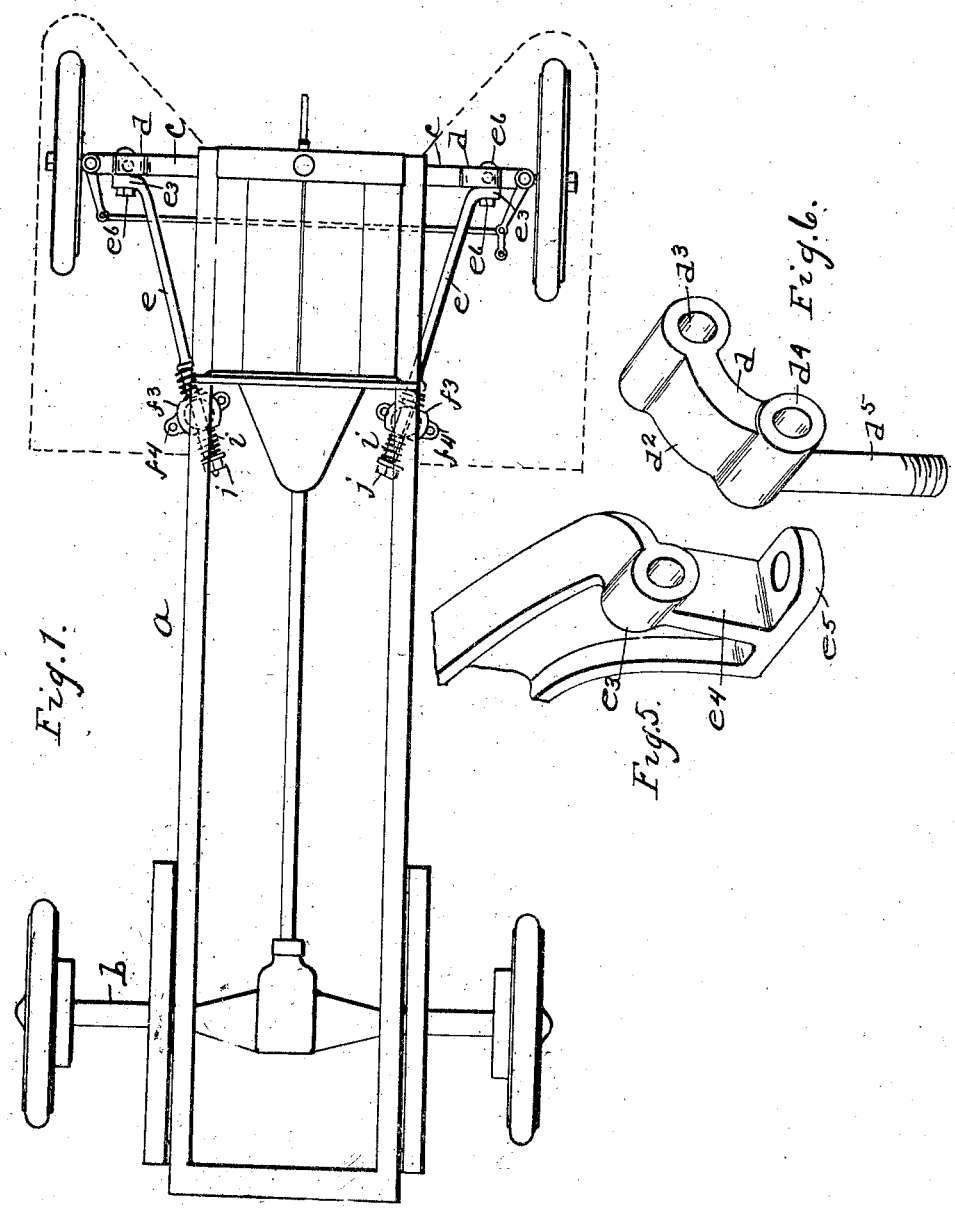

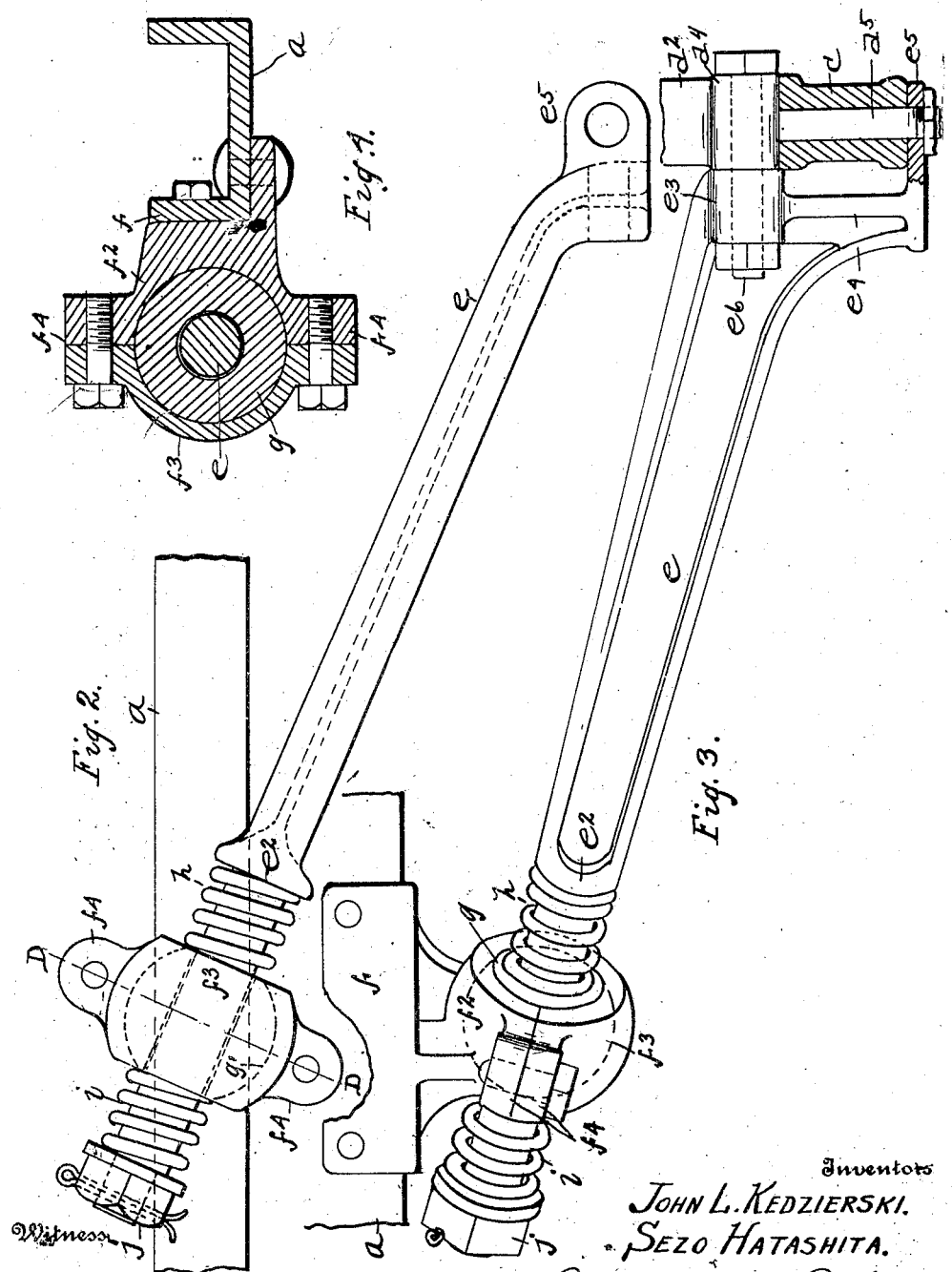

JOHN L. KEDZIERSKI AND SEZO HATASHITA, OF DETROIT, MICHIGAN, ASSIGNORS TO PARKVIEW SALES CO., OF DETROIT, MICHIGAN, A CORPORATION OF MICHIGAN.

RADIUS-ROD.

1,291,543.  Specification of Letters Patent.  Patented Jan. 14, 1919.

Application filed February 4, 1918. Serial No. 215,372.

*To all whom it may concern:*

Be it known that we, JOHN L. KEDZIERSKI and SEZO HATASHITA, citizen of the United States and subject of the Emperor of Japan, respectively, residing at Detroit, county of Wayne, State of Michigan, have invented a certain new and useful Improvement in Radius-Rods, and declare the following to be a full, clear, and exact description of the same, such as will enable others skilled in the art to which it pertains to make and use the same, reference being had to the accompanying drawings, which form a part of this specification.

Our invention relates to radius rods for automobiles and a special object of our improvements is to provide a radius rod more especially adapted to a truck or commercial vehicles. While our invention is adapted to vehicles of this kind generally it is also especially adapted to use in the cases where a Ford automobile is transformed into a commercial vehicle. In this case the radius rods upon the Ford automobile, while amply strong for a pleasure vehicle, are lacking in strength for the commercial vehicle made therefrom.

In the accompanying drawings:

Figure 1 is a plan view of an automobile embodying our invention, the front axle being in this case of the conventional Ford construction.

Fig. 2 is an inverted detail plan view showing the radius rod and its connection to the side piece of the automobile.

Fig. 3 is a side elevation of the parts shown in Fig. 2.

Fig. 4 is a detail section on the line D—D Fig. 2.

Fig. 5 is a detail perspective view showing the end of the radius rod adjacent to the front axle.

Fig. 6 is a perspective view of the pin by which the springs are secured to the front axle which, in this case, forms a part of the attachment of the radius rod to the front axle.

$a$ $a$ are the side pieces of an automobile. $b$ is the rear axle and $c$ is the front axle. Upon the front axle is a pin or fastening $d$, having a goose neck $d^2$ and a securing eye $d^3$ at its outer end. The pin $d$ has also a depending shank $d^5$ which passes through an aperture in the front axle and at the upper end of the shank $d^5$ is a securing eye $d^4$.

$e$ is a radius rod. There is one on each side of the frame which are of the same construction and therefore but one will be specifically described. The radius rod $e$ has a securing eye $e^3$ at its outwardly turned forward end, and from said eye there is a depending standard $e^4$ having a flange $e^5$ extending forward at right angles thereto. There is an aperture through the flange $e^5$ adapted to fit over the shank $d^5$ of the pin $d$.

The method of fastening the forward end of the radius rod is as follows: The flange $e^5$ is placed over the part of the shank $d^5$ extending below the front axle and is secured in place by a nut upon the outer end of said shank. This brings the securing eye $e^3$ in line with the securing eye $d^4$ and a bolt $e^6$ is passed through both of these eyes and secured by a nut in the usual manner. The spring is secured to the eye $d^3$ in the usual manner.

$f$ is a bracket secured to the side piece of the frame by flanges which are bolted to said side piece. The bracket $f$ has at its lower end a casing composed of two halves $f^2$ and $f^3$ secured together by perforated flanges $f^4$ and the usual bolts. This casing forming the socket of a ball-and-socket joint. Within the casing $f^2$ and $f^3$ is the ball $g$ which fits and has a universal motion in said casing. There is a cylindrical aperture formed through the ball $g$ through which extends the cylindrical rear portion of the radius rod $e$, the casing $f^2$ and $f^3$ being open to permit the passage of the radius rod through the ball and a sufficient universal motion of said ball and radius rod. $h$ $i$ are compression springs one on each side of the ball $g$. The ends of said springs remote from the ball bearing against a flange or shoulder $e^2$ or nut $j$, on said rod, as the case may be.

In adapting a Ford or other automobile chassis to use in a commercial vehicle or truck the radius rods to the front axle are removed and replaced by the rods $e$ $e$ with the construction above described.

This affords a strong and flexible construction well adapted to the use in a truck or commercial vehicle.

What we claim is:

1. The combination of a chassis having a side piece, a front axle and a radius rod secured to said axle toward the end thereof inclining inward and secured to said side piece by a ball and socket joint, said rod passing through the ball of said joint and being provided with a spring bearing against said rod and said ball upon each side of said ball.

2. The combination of a front axle having an aperture therethrough, a securing pin $d$ having a shank passing through said aperture and having a securing eye at its outer end, a radius rod having a securing eye $e^3$ at its forward end adapted to register with the securing eye on said pin, and a flange $e^5$ adapted to pass over the shank of said pin, and means for securing said securing eyes together and securing said flange upon said shank.

3. The combination of a chassis, an axle, a radius rod secured to said axle at one end and at the other end secured to said chassis by a ball and socket joint, said rod passing through the ball of said joint and being provided with a spring bearing against said rod and said ball upon each side of said ball.

4. The combination of a chassis having a side piece, a front axle and a radius rod secured to said axle toward the end of said axle inclining inward and secured to said side piece by a ball and socket joint, a front axle having an aperture therethrough, a securing pin $d$ having a shank passing through said aperture and having a securing eye at its outer end, a radius rod having a securing eye $e$ at its forward end adapted to register with the securing eye on said pin, and a flange $e^5$ adapted to pass over the shank of said pin, and means for securing said securing eyes together and securing said flange upon said shank.

5. The combination of a chassis, an axle, a radius rod secured to said axle at one end and at the other end secured to said chassis by a ball and socket joint, said rod passing through the ball of said joint and being provided with a spring bearing against said rod and said ball upon each side of said ball, said socket being made up of two parts adapted to embrace the ball and be rigidly secured together with openings adapted to permit the passage of said rod and springs.

In testimony whereof, we sign this specification.

JOHN L. KEDZIERSKI.
SEZO HATASHITA.